United States Patent Office 3,577,387
Patented May 4, 1971

---

3,577,387
PROCESS OF PREPARING HEAT-RESISTANT POLYMERS
Hilde Kersten, Mechenhard, Erhard Siggel, Seckmauern, and Gerhard Meyer, Obernburg, Germany, assignors to Glanzstoff AG, Wuppertal, Germany
No Drawing. Filed Jan. 3, 1969, Ser. No. 788,931
Claims priority, application Germany, Jan. 8, 1968,
P 17 20 884.3
Int. Cl. C08g 15/00
U.S. Cl. 260—47                                3 Claims

ABSTRACT OF THE DISCLOSURE

A high molecular weight polymer having recurring units of the formula

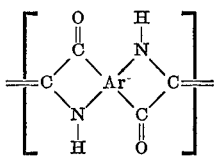

wherein Ar is one of the tetravalent aromatic radicals selected from the class consisting of phenylene, diphenylene, naphthylene, diphenylether and diphenylmethane as derived from a condensed aromatic bis-(2,4-dihydroxypyridine) compound by the steps of chlorination, alkoxylating, decarboxylating and finally polymerizing in an acid medium at about 20–300° C. Preferred long chain or relatively higher molecular weight polymers are achieved by polymerizing in inorganic non-oxidizing acids especially in polyphosphoric acid. The polymers are especially useful where stability to high temperatures and solvents is required.

---

It is known that one can produce polymeric compounds of the formula:

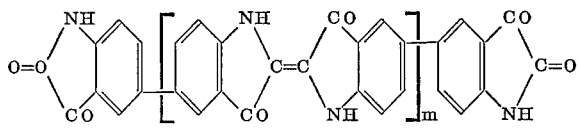

in which $m$ is a relatively small whole number, by melting 3,3′-dicarboxybenzidine-N,N′-diacetic acid with alkalis and by subsequent oxidation.

Another method for the production of these polymers starts from the same compound, which is reacted with acetic anhydride and sodium acetate. The reaction product is first saponified, and polymerization is then achieved by oxidation.

The products which can be obtained by these known processes are of relatively low molecular weight. They are soluble in trifluoacetic acid or concentrated sulfuric acid and partially soluble in dimethyl sulfoxide or alkali hyposulfite solution. The infrared spectra of these polymers exhibit a band at 1725 cm.$^{-1}$ which is an absorption of terminal non-conjugated carbonyl groups and a band at 3334 cm.$^{-1}$ which is an absorption of terminal NH groups. These spectra show that the molecular chains are comparatively short, since these bands will disappear with increasing molecular weight.

Polymers which again are of relatively low molecular weight are obtained by a similar process, in which the analogous phenylene, naphthylene and diphenylene derivatives are used as starting materials in place of the benzidine compound. The reaction is advantageously carried out as described above. These products do have a good stability to high temperatures, but they are soluble in caustic alkali solutions.

It is an object of the present invention to provide a process for the production of polymers by a series of steps beginning with an aromatic bis-(2,4-dihydroxypyridine) compound, said process leading to relatively high molecular weight polymers similar to those described hereinabove but which are more stable to heat and conventional solvents. Other objects and advantages of the invention will become more apparent from the following description.

It has now been found, in accordance with the invention, that valuable results are achieved by a process for the production of polymers which are stable at high temperatures and which contain recurring units of the formula:

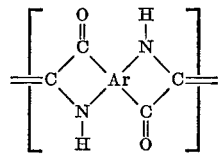

in which Ar is a phenylene, diphenylene, diphenylether, diphenylmethane or naphthylene group, said process comprising the steps of:

(1) Chlorinating in solution, preferably in an inert organic solvent, a condensed aromatic bis-(2,4-dihydroxypyridine) compound of the formula

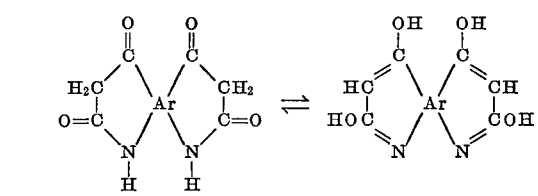

in which Ar has the meaning given above;

(2) Alkoxylating the chlorinated product of step (1) by reaction with a sodium or potassium alcoholate;

(3) Decarboxylating the product resulting from step (2) in aqueous alkali or in aqueous/alcoholic alkali solution; and (4) Polymerizing the decarboxylated product by heating in an acid medium to a temperature between 20° C. and 300° C.

The condensed, aromatic bis - (2,4-dihydroxypyridine) derivatives can be obtained by reacting an aryl diamidomalonic acid dialkyl ester with polyphosphoric acid. The aryl diamidomalonic acid diesters are preferably derived from a malonic acid lower alkyl ester and an aromatic diamine, such as phenylene diamine, benzidine, diphenylether diamine, diphenylmethane diamine or naphthylene diamine. The preparation of the initial material to be chlorinated in step (1) of the process is disclosed in detail in our copending U.S. application, Serial No. 788,932, filed January 3, 1969, the disclosure of which is incorporated herein by reference as fully as if set forth in its entirety.

Briefly, the condensed aromatic bis(2,4-dihydroxypyridine) compounds as the initial materials are prepared in good yields by reacting an aryl diamidomalonic acid dialkyl ester, in which the aryl group is the same as the groups given above for Ar and the alkyl groups are lower alkyl, e.g. of 1-4 carbon atoms, with polyphosphoric acid using a ratio by weight of the ester:acid of about 1:0.25 to 1:20 and preferably 1:0.25 to 1:5 and a reaction temperature of 130-300° C. and preferably 180-300° C., and then precipitating the reaction product with water, preferably iced water. The product is then easily separated from the reaction mixture.

The steps of the process according to the invention can be illustrated by the following reaction equations:

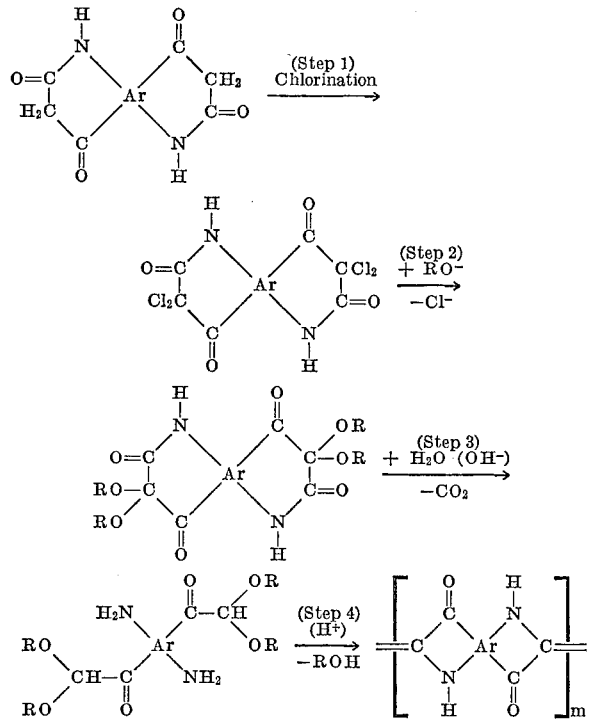

The polymers formed are dark blue to black in color and are generally insoluble in all known solvents and infusible. They are stable up to about 500° C. under nitrogen and only at high temperatures do they start to decompose slowly with the evolution of ammonia.

If the polycondensation, i.e. the last and most significant step of the reaction, is carried out in inorganic acids namely HCl, $H_2SO_4$, $H_3PO_4$, HI, HBr, relatively short chain molecules are formed with isolated CO bands in the infra-red spectrum at 1730 cm.$^{-1}$. (These products may be changed to high molecular polymers by heating to at least 200° C. In the infra-red spectra of these polymers the bands at 1730 cm.$^{-1}$ have disappeared.) Such bands are never observed in the intra-red spectrum of polymers which are obtained when the polycondensation reaction is carried out at about 100° C. in the presence of polyphosphoric acid. In this case, the CO vibrations of the conjugated polymeric compounds are displaced towards smaler wave numbers (1600 cm.$^{-1}$).

The polymerization step (4) of the invention represents the most critical step in achieving valuable new polymers, especially those of higher molecular weight which are practically insoluble in all solvents, infusible and stable against high temperatures. This step essentially involves a polycondensation of the compound

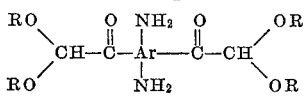

in which R represents lower alkyl, preferably methyl or ethyl, and Ar is a tetravalent aromatic radical as defined above, it being understood that each dialkoxyacetoxy group is paired with one of the amino groups so as to occupy adjacent carbon atoms on at least one of the aromatic rings represented by Ar, preferably such that the paired substituents are separated by at least one carbon atom in the aromatic ring or rings, e.g. as in the formulae:

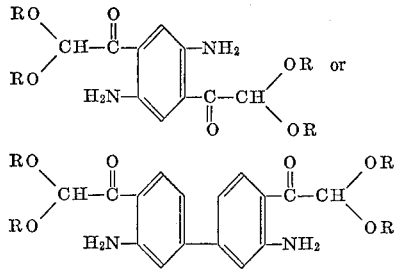

It will thus be apparent that aside from these limitations, the paired substitutents may occupy isomeric positions in the aromatic ring or rings of the Ar radical and both pairs can occupy the same or a different ring. When preparing the initial dialkoxyacetoxy-diamino-aryl monomers according to the preferred overall process of the invention, it is particularly convenient to select as the original starting material a diamino aromatic compound in which the amino groups are in para- or p,p'-position to each other and this position is then occupied by the amino groups throughout the reaction sequence. Other positions, however, are equally suitable.

While the initial dialkoxyacetoxy-diamino arylene monomers can feasibly be produced from some source other than that disclosed herein, they are obtained in the most convenient manner and with good yields by carrying out in sequence the reaction steps (1), (2) and (3) as outlined above.

The first chlorination step is preferably carried out in any substantially inert solvent, preferably an organic solvent such as dioxane, at an elevated temperature of about 50 to 150° C., using hydrochloric acid as the chlorinating agent in the presence of an oxodizing agent such as hydrogen peroxide.

After the chlorinated product of step (1) is recovered, preferably with purification by recrystallization, it is alkoxylated in step (2), preferably with sodium or potassium alcoholate under reflux in an aqueous or aqueous/alcoholic medium. The reaction mixture is preferably maintained at a temperature of about 50 to 150° C. during this alkoxylation. The alcohols employed in this step, including that which forms the alcoholate of sodium or potassium, should generally be a lower alkanol, e.g. of 1 to 4 carbon atoms, and preferably methanol or ethanol. It is most convenient to use the same alkanol throughout, i.e. so that the alkoxy groups (RO—) are always identical, e.g. methoxy or ethoxy.

The decarboxylation of the product of step (2) proceeds quite readily as step (3) at an elevated temperature of about 50 to 150° C. in an aqueous alkaline solution which may also contain a relatively large amount of the lower alkanol. This step should be carried out under an inert atmosphere such as nitrogen in order to achieve a relatively pure dialkoxyacetoxydiamino arylene product which can then be washed substantially free of alkaline solution and recrystallized before it is subjected to the required polymerization under acid conditions.

The polymerization of the product of step (3) can be accomplished at relatively low temperatures e.g. from about 20° C. up to a relatively high temperature of 300° C. However, especially good results are achieved in a temperature range of about 100° C. to 200° C. It is essential for this polymerization or polycondensation to take place in the presence of an acid, and somewhat different results are achieved, depending upon the particular acid employed. In general, however, the following acids have been found to be suitable for this step: "strong inorganic non-oxidizing acids" especially HCl, HBr, HI, $H_2SO_4$ and $H_3PO_4$.

In order to achieve a relatively high molecular weight polymer product, i.e. one with long molecule chains, it is especially advisable to employ polyphosphoric acid, e.g. as obtained by heating $H_3PO_4$ with sufficient phosphoric anhydride to give the resulting product a $P_2O_5$ content of about 82–85%. By using the above named other strong inorganic non-oxidizing acids, relatively low molecular weight polymers are obtained, which can be transferred to high molecular products by heating to at least 200° C.

The polymers which are obtained by known processes which have relatively low molecular weights are soluble in trifluoracetic acid or concentrated sulfuric acid or caustic alkali solutions or partially soluble in dimethyl sulfoxide or alkali hyposulfite solution. Otherwise they are described as having end groups as 2,3 indolinedione.

On the other hand, those polymers as obtained by the inventive process for example by using polyphosphoric acid as the polymerization reaction medium achieve very high molecular weights because their infra-red spectra is substantially free of any isolated or terminal CO-band at 1730 cm.$^{-1}$. Furthermore, these high molecular weight polymers are quite infusible and will not dissolve in any conventional solvent, including caustic alkali solutions.

The process is further illustrated by the following examples:

EXAMPLE 1

(a) Chlorination 11.2 grams of bis-[2,4-dihydroxy-quinolyl-(6)]-methane are heated to boiling in a mixture of 40 ml. of dioxane, 20 ml. of concentrated hydrochloric acid and 8 ml. of water. After removing the source of heat, 35 ml. of 30% $H_2O_2$ solution are added dropwise with stirring, and the exothermic reaction which occurs proceeds with gentle boiling. After the addition of the $H_2O_2$ has been completed, the reaction is allowed to continue for another 15 minutes while boiling. The mixture is then cooled and the oil which initially separates out is gradually completely crystallized. After filtering with suction, yellow crystals are obtained, which can be recrystallized from dioxane or dissolved and re-precipitated from dioxane/water. Yield: 14.5 grams (92% of the theoretical yield) of bis-[1,2,3,4-tetrahydro-3,3-dichloro-2,4-dioxo-quinolyl - (6)]-methane (I) which has a melting point of 145° C.

*Analytical results.*—Calculated (percent): C, 48.33; H, 2.14; N, 5.93; Cl, 30.04. Found (percent): C, 48.6; H, 2.6; N, 5.68; Cl, 29.6.

(b) Methoxylation

A suspension of 23.6 grams of compound (I) in 125 ml. of absolute methanol is added to a solution of 7 grams of sodium in 125 ml. of absolute methanol. The mixture is boiled for 5 minutes under reflux and the reaction takes place with dissolution of the chlorinated product. After cooling to room temperature, the solution is poured onto a mixture of 25 ml. of concentrated HCl and 350 ml. of iced water. The bis-[1,2,3,4-tetrahydro-3,3-dimethoxy-2,4-dioxo-quinolyl-(6)]-methane (II) formed is filtered off using suction, and after standing for one hour the precipitate is washed with water until the washings are neutral.

Yield: 21 grams of II=92%. The substance can be recrystallized from isopropanol. Melting point=144° C.

*Analytical results.*—Calculated (percent): C, 60.79; H, 4.88; N, 6.16. Found (percent): C, 60.8; H, 5.3; N, 6.07.

(c) Decarboxylation 10 grams of the compound II are refluxed in 50 ml. of 2 N NaOH with stirring under a nitrogen atmosphere. After cooling the reaction product separates out as an oil. The supernatant aqueous solution is decanted off and the oil is covered with a little methanol. The oil slowly solidifies to form a crystal slurry. The crystals are filtered off from the supernatant solution using suction, and 7.5 grams (85% of the theoretical yield) of yellow crystalline bis-[1-amino - 2 - (glyoxal - dimethylacetalyl)-phenyl-4]-methane (III) are obtained. After being recrystallized from methanol, the compound melts at 89–90° C.

Calculated (percent): C, 62.67; H, 6.51; N, 6.96. Found (percent): C, 62.3; H, 6.8; N, 6.9.

(d) Polycondensation 3 grams of the compound III are heated in 20% hydrochloric acid for one hour at 100° C. The dark blue to black compound of the following structure:

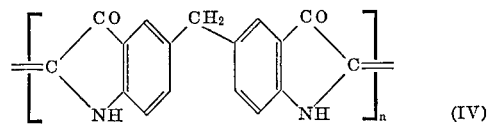

quickly separates out as the alcohol is split off. The product is filtered using suction, washed until neutral and dried. The yield is quantitative. The precipitated polymer compound shows, in the infra-red spectrum, terminal isolated CO bands at 1730 cm.$^{-1}$ and conjugated CO bands at 1600 cm.$^{-1}$. It can be concluded from this that the polymer molecules have relatively short chains.

If the polycondensation step is conducted in 5 ml. of polyphosphoric acid, by heating for about 3 hours at 100° C., a polymer of higher molecular weight and of the Formula IV (given above) is obtained. The mixture, after cooling to room temperature, is diluted with water, the precipitate is filtered off using suction, washed until neutral and dried. The infra-red spectrum shows no isolated CO band at 1730 cm.$^{-1}$. The polymer is insoluble in conventional solvents and infusible, and it is stable in a nitrogen atmosphere at temperatures up to 500° C.

EXAMPLE 2

(a) Chlorination 11.2 grams of bis-[2,4-dihydroxy-quinolyl-(6)]-ether are heated, as in Example 1, in 40 ml. of dioxane, 20 ml. of concentrated HCl and 8 ml. of water to boiling point and then 35 ml. of 30% $H_2O_2$ solution are added. The working up and purification is effected as above.

Yield: 14.5 g. of bis-[1,2,3,4-tetrahydro-3,3-dichloro-2,4-dioxy-quinolyl-(6)]-ether (V) (92% of the theoretical yield); melting point=160° C.

*Analytical results.*—Calculated (percent): C, 45.60; H, 1.70; N, 5.90; Cl, 29.91. Found (percent): C, 45.9; H, 1.9; N, 5.87; Cl, 29.4.

(b) Methoxylation 23.7 grams of the compound V are reacted with 7 grams of sodium in absolute methanol and worked up as set forth in Example 1(b) above. 21 grams (92% of the theoretical yield) of bis-[1,2,3,4-tetrahydro-3,3-dimethoxy-2,4-dioxoquinolyl-(6)]-ether (VI) is formed. The compound can be recrystallized from isopropanol. Melting point=151° C.

*Analytical results.*—Calculated (percent): C, 57.89; H, 4.42; N, 6.14. Found (percent): C, 58.0; H, 4.8; N, 6.4.

(c) Decarboxylation 10 grams of the methoxy compound VI are reacted with 2 N NaOH and worked up as in Example 1(c).

6.4 grams (72% of the theoretical yield) of bis-[1-amino - 2 - (glyoxal - dimethyl - acetalyl) - phenyl - 4]-ether (VII) are formed as yellow crystals. The recrystallization is effected from methanol. Melting point=94° C.

*Analytical results.*—Calculated (percent): C, 59.40; H, 5.98; N, 6.93. Found (percent): C, 59.8; H, 6.08; N, 6.6.

(d) Polycondensation 3 grams of the compound VII are heated in 20% hydrochloric acid for one hour at 100° C. The dark blue to black compound of the following structure:

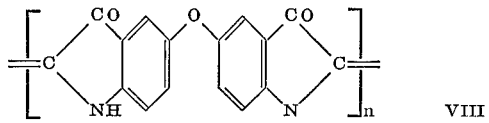 VIII separates out very quickly as alcohol is split off. The product is filtered off using suction, washed until neutral and dried. The yield is quantitative. The precipitated polymer compound shows, in the infra-red spectrum, terminal isolated CO bands at 1730 cm.$^{-1}$ and the conjugate CO bands at 1600 cm.$^{-1}$. This means that the polymer contains relatively short chain molecules.

If the polycondensation step is carried out in 5 ml. of polyphosphoric acid, by heating for about 3 hours at 100° C., polymers of the above Formula VIII, but of higher molecular weight are obtained. The mixture, after being cooled to room temperature, is then diluted with water, the precipitate is filtered off using suction, washed until neutral and dried. The infra-red spectrum does not show any isolated CO band at 1730 cm.$^{-1}$, but only the conjugate CO vibration at 1600 cm.$^{-1}$. The polymer is insoluble in conventional solvents and infusible, and it is stable in nitrogen atmosphere at temperatures up to 500° C.

EXAMPLE 3

(a) Chlorination

Following the same procedure as in Example 1, 10.7 grams of bis-(2,4-dihydroxy-quinoline-6) are reacted in 40 ml. of dioxane, 20 ml. of concentrated HCl and 8 ml. of water and then with 35 ml. of 30% $H_2O_2$ solution and worked up to obtain the chlorinated product.

The yield of bis-[1,2,3,4-tetrahydro-3,3-dichloro-2,4-dioxo-quinoline-(6)] as compound (IX) is 14.5 grams. Melting point >350° C.

Purification is effected by dissolving and reprecipitating from a tetrahydrofuran/water solvent.

*Analytical results.*—Calculated (percent): C, 47.19; H, 1.76; N, 6.11. Found (percent): C, 47.4; H, 1.9; N, 5.9.

(b) Methoxylation 22.9 grams of IX are reacted as in Example 1(b) with 7 grams of sodium in absolute methanol and worked up in the same way. 21 grams (95% of the theoretical yield) of bis-[1,2,3,4-tetrahydro-3,3-dimethoxy-2,4-dioxo-quinoline-(6)] as compound (X) is formed. Melting point =300° C.

*Analytical results.*—Calculated (percent): C, 59.9; H, 4.58; N, 6.36. Found (percent): C, 58.9; H, 4.52; N, 6.93.

(c) Decarboxylation 10 grams of compound X is heated with 50 ml. of a 2 N NaOH to boiling point as in Example 1 and is then worked up in the same way. 2.5 grams (28% of the theoretical yield) of bis-[1-amino-2-(glyoxaldimethyl-acetalyl)-phenyl-4] as compound (XI) are formed as yellow crystals. Melting point=145° C.

*Analytical results.*—Calculated (percent): C, 61.84; H, 6.23; N, 7.21. Found (percent): C, 61.9; H, 6.48; N, 6.9.

(d) Polycondensation 3 grams of compound XI are heated in 20% hydrochloric acid for one hour at 100° C. A dark blue to black compound of the following structure:

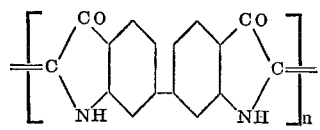 (XII)

separates out very quickly as alcohol is split off. The product is filtered off using suction, washed until neutral and dried. The yield is quantitative. The precipitated polymer compound still shows, in the infra-red spectrum, terminal isolated CO bands at 1730 cm.$^{-1}$ and conjugate CO bands at 1600 cm.$^{-1}$. This means that the material still contains only relatively short chain polymer molecules.

If the polycondensation is carried out in 5 ml. of polyphosphoric acid, by heating for about 3 hours at 100° C., polymers of higher molecular weight and of the above Formula XII are obtained. The mixture, after cooling to room temperature, is then diluted with water, the precipitate is filtered off with suction, washed until neutral and dried. The infra-red spectrum does not show any isolated CO band at 1730 cm.$^{-1}$, but only the conjugated CO vibration at 1600 cm.$^{-1}$. The polymer is insoluble in conventional solvents and infusible, and it is stable in a nitrogen atmosphere at temperatures of up to 500° C.

The final polymer product, e.g. as obtained by using polyphosphoric acid in accordance with the polycondensation step (d) of Example 3, can be utilized in accordance with the following example.

EXAMPLE 4

6 g. bis-1-amino-2-(glyoxal-dimethyl-acetalyl)-phenyl-4-ether (VII) is dissolved at about 20° C. in 200 g. viscose (containing 6.6% high grade pulp) with a spinning viscosity higher than 80 ball fall seconds and a value of 40, together with 100 ml. water and 100 ml. pyridine. The solution is spun through a nozzle with 36 holes of a diameter of 90μ into a spinning bath maintained at 50° C., containing 6% $H_2SO_4$, 15% $Na_2SO_4$ and 2% $ZnSO_4$. The resulting filament is then led through a second bath, in which a sulfuric acid concentration of 2% and a temperature of 98° C. are maintained. In this second bath a drawing takes place as it is usual in a viscose spinning process. The filament is then washed with water until acid and salts are removed. Afterwards the filament is led through an electrical heated zone, in which the filament is heated during 10 seconds to a temperature of about 200–220° C. The filament has a tensile strength of 2.0 g./den. and an elongation at break of 14%. It is noninflammable and infusible.

EXAMPLE 5

10 g. of the compound VII is dissolved in 250 ml. dimethylformamide together with 20 g. polyacrylonitrile. This solution is spun through a nozzle (36 holes with a diameter of 90μ) into a spinning bath, consisting of a 7% aqueous hydrochloric acid. The resulting filament is drawn on electrical heated wheels, having a temperature of about 200–220° C. The obtained black filament has a tensile strength of 1.7 g./den. and an elongation at break of 18%. It is noninflammable and infusible.

The invention is hereby claimed as follows:

1. A process for the production of a heat-stable, infusible and solvent-insoluble polymer consisting essentially of recurring units of the formula

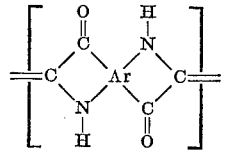

wherein Ar represents a tetravalent aromatic radical selected from the class consisting of phenylene, diphenylene, naphthylene, diphenylether and diphenylmethane, which process comprises polymerizing in a strong inorganic non-oxidizing acid medium at a temperature of between about 20° C. and 300° C. a compound of the formula

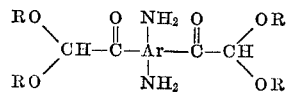

wherein Ar has the same meaning as given above and R represents lower alkyl.

2. A process as claimed in claim 1 wherein said polymerization is carried out in a strong inorganic non-oxidizing acid selected from the group consisting of HCl, HBr, HI, $H_2SO_4$ and $H_3PO_4$ to obtain a relatively lower molecular weight polymer containing terminal isolated CO bands at 1730 cm.$^{-1}$ of the infra-red spectrum.

3. A process as claimed in claim 1 wherein said polymerization is carried out in polyphosphoric acid to obtain a relatively higher molecular weight polymer substantially free of terminal isolated CO bands at 1730 cm.$^{-1}$ of the infra-red spectrum.

References Cited

UNITED STATES PATENTS 3,306,876  2/1967  Kantor et al. _____ 260—47
3,414,545  12/1968  Bach _____ 260—78

WILLIAM H. SHORT, Primary Examiner

MELVIN GOLDSTEIN, Assistant Examiner

U.S. Cl. X.R.

260—2, 9, 63, 898; 264—184, 188

Notice of Adverse Decision in Interference

In Interference No. 98,251 involving Patent No. 3,577,393, A. Schrage and J. E. Schoenberg, ETHYLENE-PROPYLENE-DIENE TERPOLYMER RUBBERS AND PROCESSES THEREFOR, final judgment adverse to the patentees was rendered Mar. 13, 1974, as to claims 1 and 2.

[*Official Gazette July 2, 1974.*]